May 3, 1955   J. R. ROBERTS   2,707,433
METHOD AND MEANS FOR LINE PRINTING
Filed May 18, 1949   6 Sheets-Sheet 1

Inventor:
John R. Roberts
By: Zabel & Dietzbaugh
Attorneys

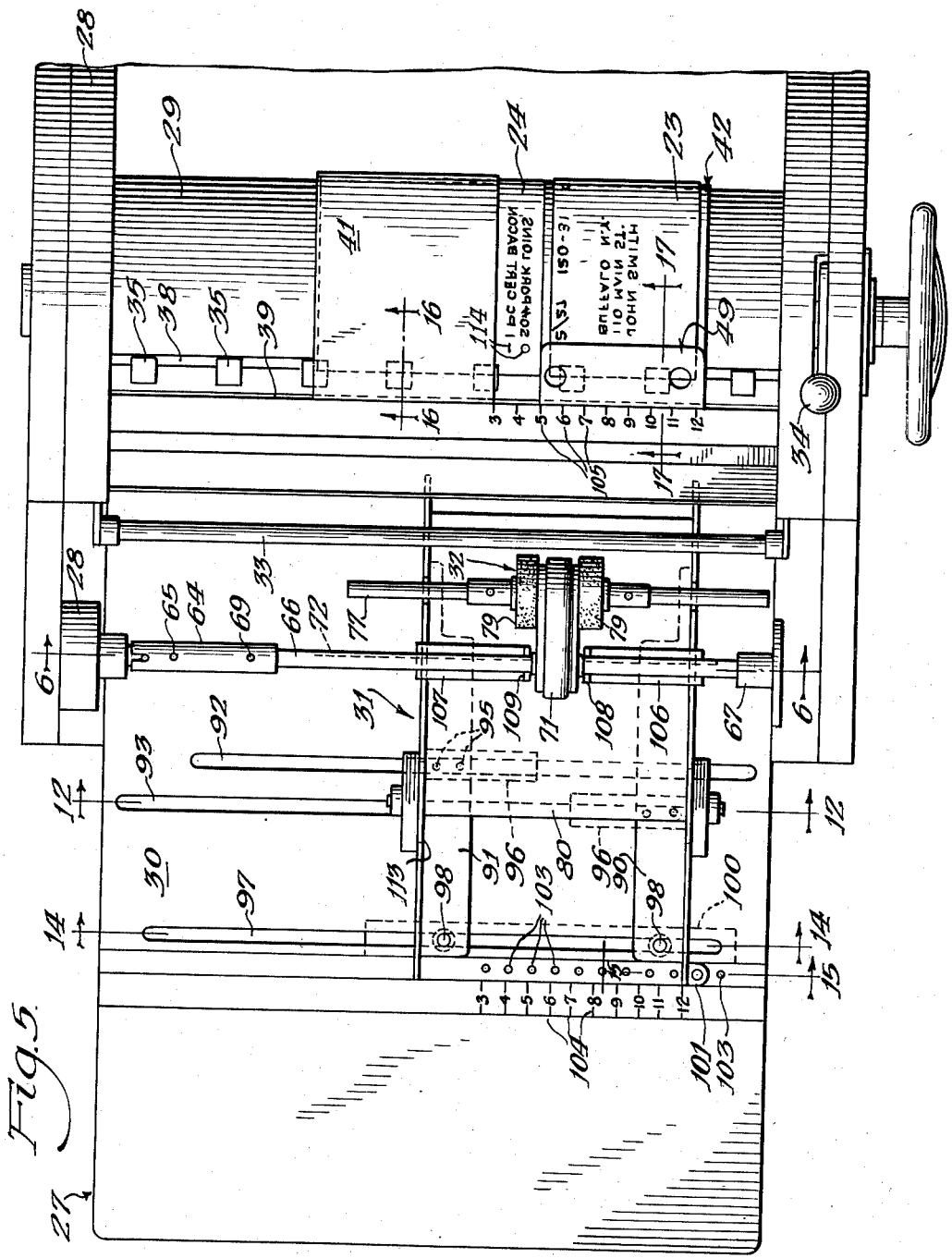

May 3, 1955
J. R. ROBERTS
2,707,433
METHOD AND MEANS FOR LINE PRINTING
Filed May 18, 1949
6 Sheets-Sheet 3
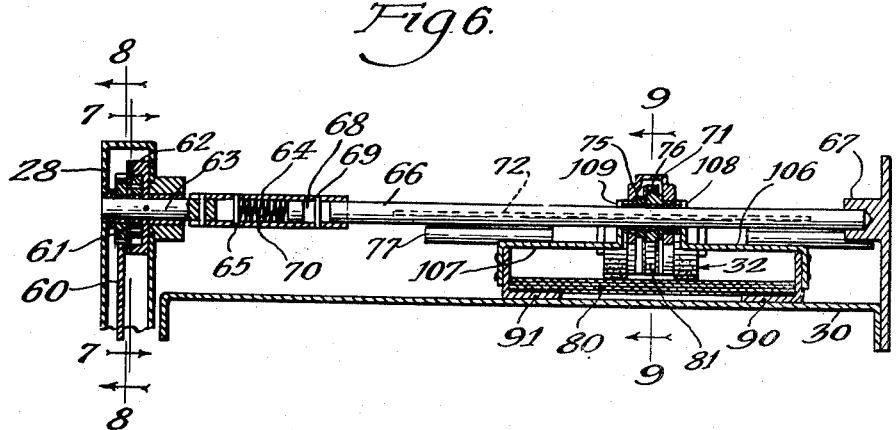
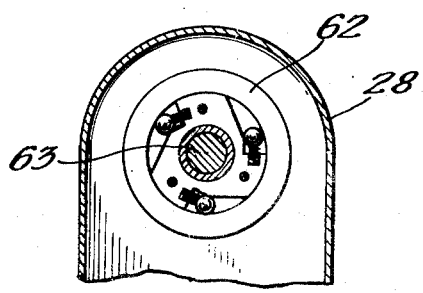
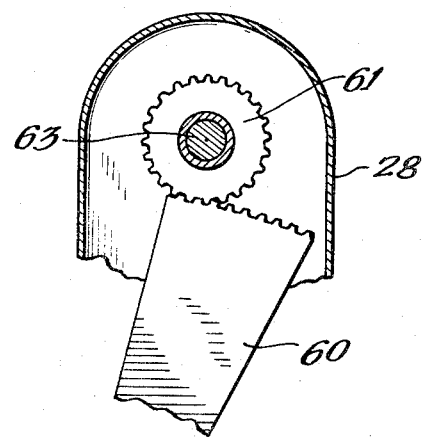
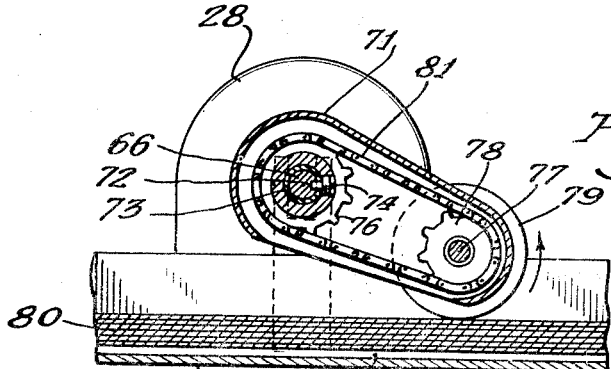
Inventor:
John R. Roberts
By Zahl & Gritzlaugh
Attorneys May 3, 1955  J. R. ROBERTS  2,707,433
METHOD AND MEANS FOR LINE PRINTING
Filed May 18, 1949  6 Sheets-Sheet 4
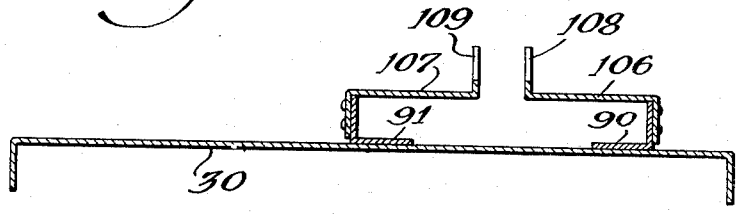
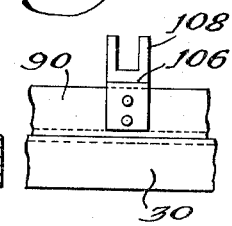
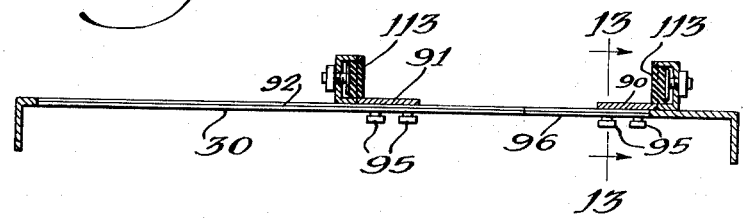
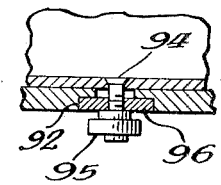
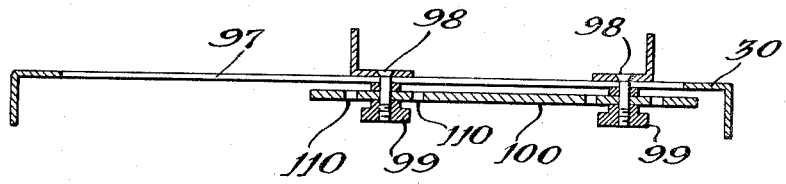
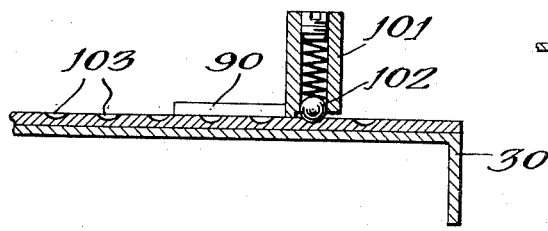
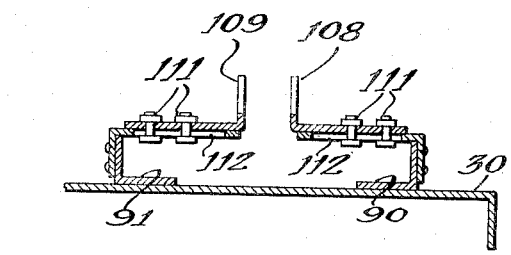
Inventor:
John R. Roberts
By Zahel & Dritzbaugh
Attorneys

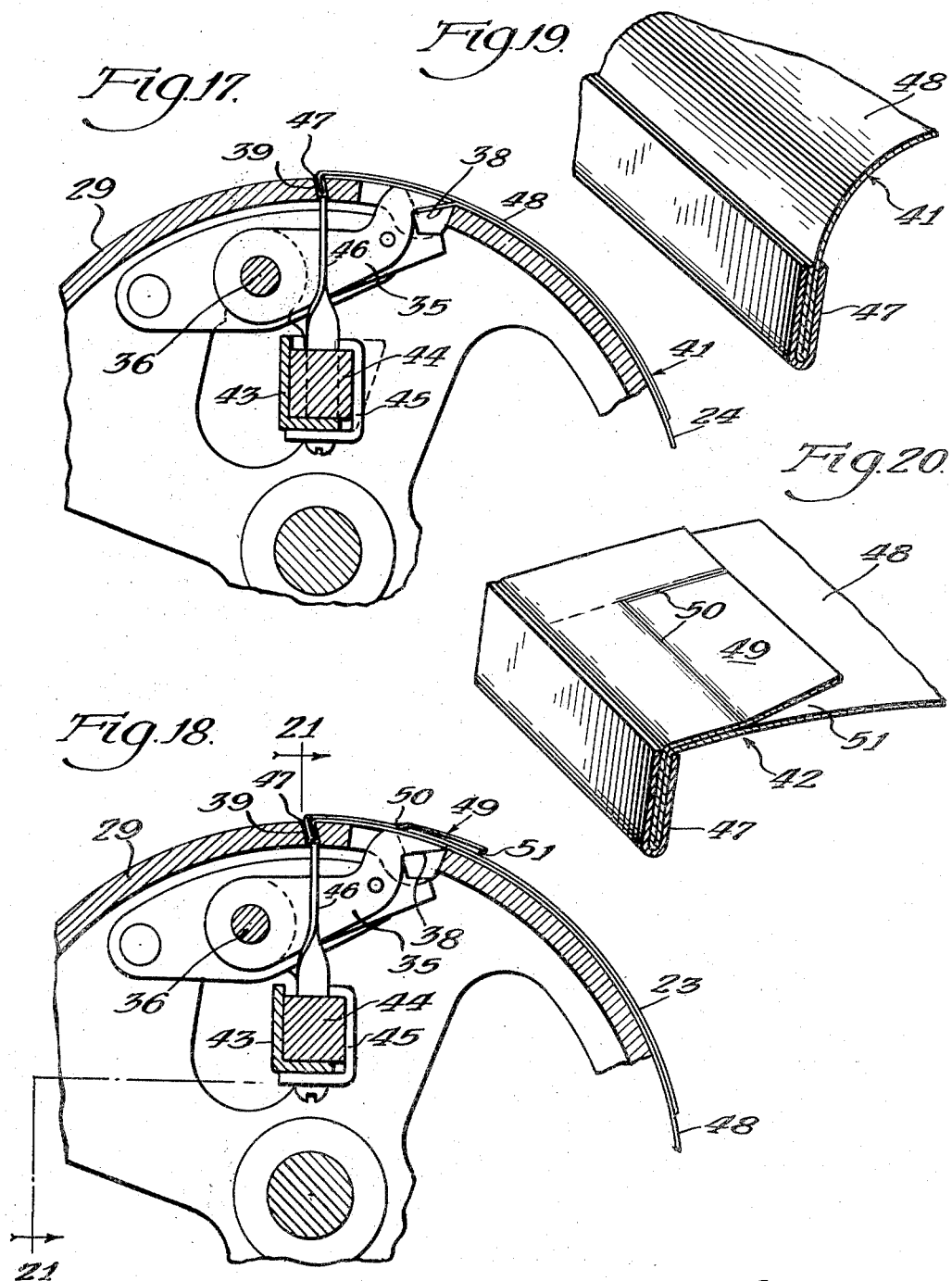

May 3, 1955      J. R. ROBERTS      2,707,433
METHOD AND MEANS FOR LINE PRINTING
Filed May 18, 1949      6 Sheets-Sheet 6
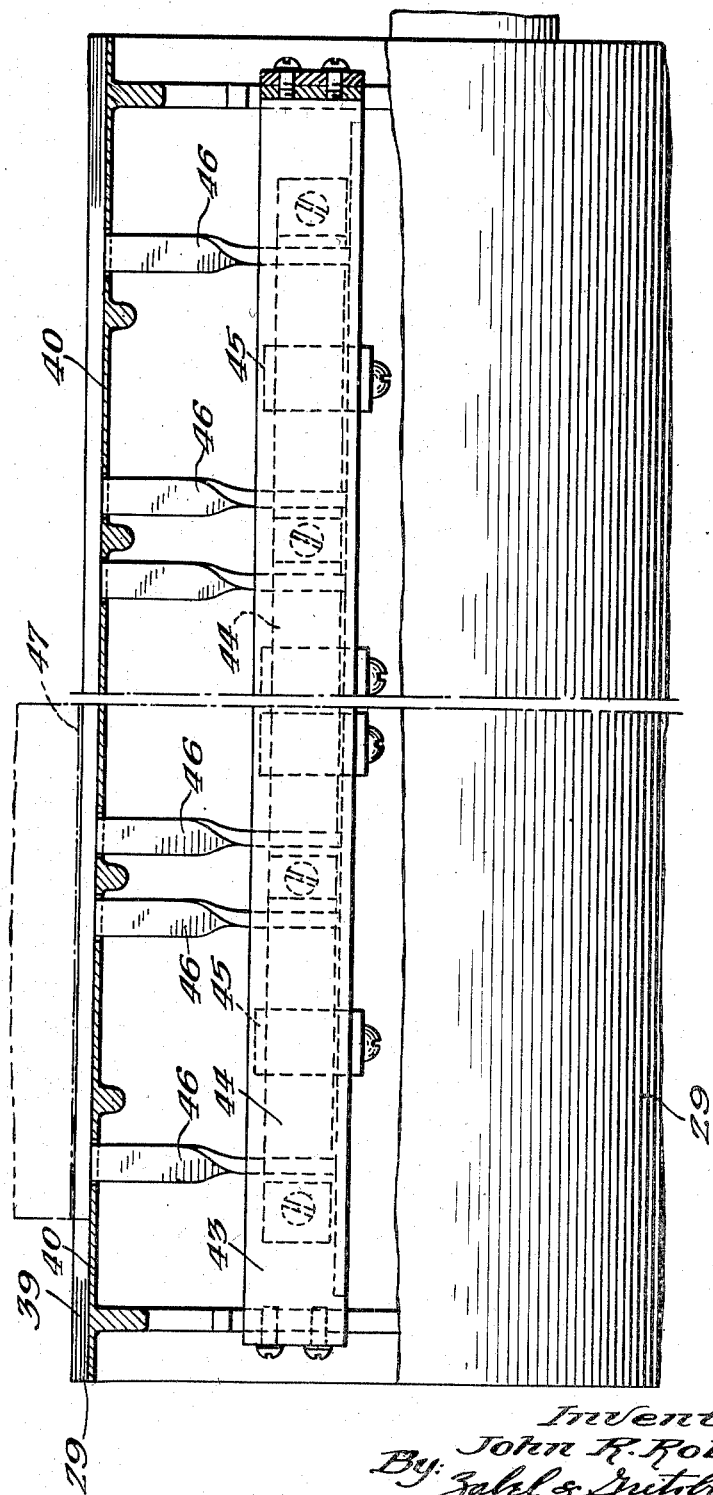

United States Patent Office 2,707,433
Patented May 3, 1955

2,707,433

METHOD AND MEANS FOR LINE PRINTING

John R. Roberts, Glenview, Ill., assignor to Ditto, Incorporated, Chicago, Ill., a corporation of West Virginia Application May 18, 1949, Serial No. 93,941

5 Claims. (Cl. 101—132)

This invention relates to an improved line printing device and to a method of line printing.

It is an object of my invention to provide an improved apparatus and method for printing or duplicating only selected portions of matter carried on the drum or bed of a duplicating machine or the like.

Another object is to provide an improved apparatus and method for printing or duplicating only selected portions of a master sheet on a series of copy sheets, the duplicated portions all appearing in the same relative positions on the copy sheets irrespective of the positions of said selected portions on the master sheet.

Still another object is to provide an improved apparatus and method for duplicating the heading and certain items of an order, invoice, or the like, in such a manner that the space between the heading and the duplicated items on the copy sheet will be constant irrespective of their spacial relationship on the order.

A further object is to provide an improved apparatus and method for duplicating the separate items or groups of items appearing on a master sheet which represent an order, or the like, on a series of separate copy sheets in such a manner as to insure that no item or group of items will be skipped.

A further object is to provide improved means for mounting a master sheet on the drum of a duplicating machine so that the position of the master sheet may be readily shifted with respect to the axis of the drum.

A still further object is to provide an improved sheet feeding mechanism which can be shifted with respect to the axis of the drum.

Still another object is to provide an improved duplicating device in which both the copy sheets and a master sheet can be shifted longitudinally of the drum so that matter on the master sheet can be duplicated on each one of a series of copy sheets in the same corresponding position.

Other objects, features and advantages of my invention will become apparent as the description proceeds.

With reference now to the drawings in which like reference numerals designate like parts:

Figs. 1 and 2 are elevations, showing the obverse and reverse sides respectively, of a master sheet, portions of which are to be duplicated in accordance with my invention;

Figs. 3 and 4 are views of two different copy sheets on which have been duplicated said portions of the master sheet of Figs. 1 and 2;

Fig. 5 is a plan view of a duplicating machine embodying my invention;

Fig. 6 is a transverse section along line 6—6 of Fig. 5;
Fig. 7 is a vertical section along line 7—7 of Fig. 6;
Fig. 8 is a vertical section along line 8—8 of Fig. 6;
Fig. 9 is a vertical section along line 9—9 of Fig. 6;
Fig. 10 is a section similar to Fig. 6 but showing just certain portions thereof;
Fig. 11 is an end view of Fig. 10;
Fig. 12 is a section taken along line 12—12 of Fig. 5;
Fig. 13 is a section taken along line 13—13 of Fig. 12;
Fig. 14 is a section taken along line 14—14 of Fig. 5;
Fig. 15 is a section taken along line 15—15 of Fig. 5;
Fig. 16 is a view similar to Fig. 10 but showing a modified form of my invention;
Figs. 17 and 18 are vertical sections along lines 17—17 and 18—18, respectively, of Fig. 5, showing the drum and the relationship of certain overlying elements;
Fig. 19 is a perspective view of a block-out;
Fig. 20 is a perspective view of a combined block-out and master sheet holder; and
Fig. 21 is an axial section of the drum taken along line 21—21 of Fig. 18.

In Figs. 1 and 2, the reference numeral 21 designates generally a master sheet which is separated by a tear line 22 or the like into two portions, one portion being a heading master 23 and the other being a line master 24. This particular master sheet is in the form of an order in which the name and address of the customer to which shipment is to be made is shown on the heading master 23 and in which the goods to be shipped are itemized on the line master 24.

In Fig. 3 is shown a copy sheet 25 on which has been duplicated the heading and the first and second items which appear on the master.

Fig. 4 shows another copy sheet 26 on which has been duplicated the heading and the third, fourth and fifth items shown on the master sheet 21.

The copy sheets 25 and 26 are produced by separating the master sheet along the tear line into the two separate masters 23 and 24, and by mounting them on the drum of a duplicating machine in a predetermined spacial relationship. This spacial relationship is shifted in accordance with the lines to be duplicated, all other lines or portions of the line master 24 being blocked out.

Fig. 5 shows in plan view a duplicating machine of a standard type which embodies the particular improvements which comprise my invention and which permit the practice of the method embodying my invention. The duplicating machine 27 comprises a frame 28, a drum 29 rotatably mounted in said frame, and a feed table 30 which is disposed in front of the drum. Mounted on the feed table is a transversely shiftable sheet forwarding device which comprises a tray 31 and advancing mechanism 32. In this particular duplicating machine, the drum is motor driven, and its operation is controlled by a trip bar 33 and a control lever 34. The drum is provided with the usual grippers 35 by means of which a master may be secured to the drum, and the control lever 34 also operates the grippers. As shown in Figs. 17 and 18, the grippers are mounted upon a common shaft 36 in the drum wall. The gripping surfaces of the grippers cooperate with the wall of a groove 38 which runs lengthwise of the drum in order that the marginal edge of a master sheet may be secured to the drum surface. The particular construction of the grippers forms no part of this invention; it is described in greater detail in Hernlund Patent No. 2,117,165, dated May 10, 1938.

The drum is driven in the counterclockwise direction, as viewed in Figs. 17 and 18. Somewhat forwardly of the grippers, that is, in the counterclockwise direction, there is a slot 39 in the drum wall which does not extend all the way through the wall, a web 40 serving to separate the slot from the interior of the drum. The slot is provided to receive the block out 41 and the combination block-out and master carrier 42. An L-shaped cross bar 43, mounted on the end walls of the drum, extends lengthwise of the drum below the slot 39. As shown in Fig. 21, a number of bar magnets 44 are mounted on the cross bar 43 by means of brackets 45, the cross bar and brackets being made of suitable non-magnetic material. Pole pieces 46 of magnetic material are suitably secured to the poles of the magnets 44 and extend upwardly and project through apertures formed in the web 40.

The block-out elements 41 and 42 each comprise a U-shaped steel clip 47 which is secured to the edge of a piece of flexible material 48. As a flexible material, I prefer to use very thin gauge sheet steel, such as shim steel. However, other flexible materials may be used, such as tracing cloth. When the clip 47 is inserted in the slot 39, it will rest against the web 40, and will be held in place by the pole pieces and magnets. The pole pieces terminate at or just below the upper surface of the web so as to insure that the clip will be disposed parallel to the axis of the drum. The combined block-out and master carrier 42 also includes a flap 49 which is secured, as by spot welding along lines 50, to the main body of flexible material 48 so as to form a pocket to receive the heading master 23. The flap 49 may be just a folded over extension of the flexible material 48, as shown in Fig. 20.

In operation, as the drum 29 is rotated, copy sheets are feed from the table 30 into contact with the drum or whatever overlies the same. As shown in Figs. 5, 17 and 18, the line master is secured to the drum by the grippers 35 and the heading master is mounted on the drum by means of the combined block-out and master carrier 42. The block-out 41 overlies the last three items of the line master, and the combined block-out 42 overlies the upper marginal portion of the line master, leaving the first two lines of the line master exposed for duplicating. The spacing 52 between the heading and the items on the copy sheets 25 and 26 is determined by the position of the heading master 23 with respect to the combined block-out 42. Thus, this spacing can be maintained constant irrespective of the position on the line master of that portion thereof which is to be duplicated. To duplicate the last three lines of the line master the combined block-out 42 is shoved up against the block-out 41, thereby covering the first two lines, and the block-out 41 is then shifted to exposed the next three lines. The magnetic means for holding the block-outs on the drum permits the shifting of the block-outs in an axial direction.

In order that the matter to be duplicated may be duplicated in the same relative position on all of the copy sheets, the sheet feeding device is shiftable on the table 30. The sheet feeding device comprises a sheet advancing mechanism 32 and a tray 31, both of which are shiftable. The advancing mechanism comprises a gear sector 60 pivotally mounted in the frame 28 which is reciprocated by suitable mechanism not shown herein. The reciprocation is timed with respect to the rotation of the drum. A pinion 61, mounted on one element of a free wheeling clutch 62, is driven by the sector, as shown in Figs. 6 and 8. The other element of clutch 62 is mounted on a stub shaft 63 which is journaled in the frame. Therefore, the shaft is driven in one direction only, the forward direction, by virtue of this ararngement which includes the clutch 62. A sleeve 64 is removably mounted on the stud shaft 63, driving connection between the two being provided with a pin 65 which extends through suitable slots formed at the left end of the sleeve. A shaft 66 is received in the right hand end of sleeve 64. The other end of the shaft is rotatably received in a socket 67 at the opposite side of the machine. The shaft 66 is provided with a slotted portion 68 at its left end, as viewed in Fig. 6, which slotted portion is engaged by a pin 69 which is secured in the sleeve 64. The slotted portion and the pin form a rotatable driving connection between the sleeve and the shaft 66, which permits longitudinal movement of the shaft with respect to the sleeve so that the right hand end may be removed from socket 67. Thus, the effective length of the shaft assembly, which includes the sleeve 64 and shaft 66, may be shortened to permit its removal from the stub shaft 63 and the socket 67. A coil spring 70 disposed within the sleeve bears against the end of the shaft 66 to maintain the shaft assembly in its extended position. Thus, the removable shaft assembly is driven intermittently in one direction. This arrangement is very similar to that shown in Wimmer Patent No. 2,204,715 dated June 18, 1940 to which reference is hereby made.

As in that patent, an arm 71 in the form of a housing is rotatably journaled on the shaft 66. In this particular arrangement the shaft 66 is provided with a keyway 72, and a sleeve 73 is slidably mounted on the shaft and keyed thereto by a dog point screw 74. The housing is provided with suitable bushings 75 by means of which it is rotatably mounted on sleeve 73. A gear 76 is disposed within the housing and spaced from the walls thereof by the bushings 75. The dog point screw 74 is threaded into the hub portion of the gear so that the gear rotates with the shaft 66.

A shaft 77 is suitably journaled at the outer end of the housing 71 and carries a gear 78 which is pinned to the shaft at a point within the housing. Rubber wheels 79 are also suitably pinned to the shaft 77 and are adapted to rest on the top of a stack 80 of copy sheets. A chain 81 provides a driving connection between gears 76 and 78.

In operation, it will be seen that intermittent unidirectional rotation of the shaft 66 will cause the rubber wheels 79 to be rotated to advance the top sheet from the stack 80. Since the housing 71 is rotatable with respect to the shaft, it may be swung upwardly to permit replenishment of the stack 80. During operation, its weight causes it to rest on the stack as shown in Fig. 9. It will be observed that the shaft 77 is extended to facilitate the swinging of the housing 71 away from the stack and into inoperative position.

The tray 31 comprises a pair of L-shaped side guides 90 and 91 which are mounted for sliding movement in transverse slots 92 and 93, respectively, formed in the table 30. As shown in Figs. 12 and 13 two spaced screws 94 extend downwardly from the horizontal portion of each side guide, the heads of the screws being preferably non-rotatably secured to the side guide. Nuts 95 are provided for the screws. The screws extend downwardly through the slots 92 and 93, respectively, and pass through elongated blocks 96 which are slidably disposed in recesses formed in the underside of table 30. By tightening up the nuts 95, the side guides can be located in any desired position. The arrangement including the spaced screws and the blocks insure that each of the side guides will be properly aligned, parallel to the direction of the paper feed and parallel to each other. It will be observed that a separate slot is provided for each side guide, the slots being offset from each other, so that there will be no interference between the blocks which would serve to prevent the side guides to be brought up relatively close to each other, for the feeding of narrow copy sheets.

A slot 97 is provided in the table at the rear end of the side guides. Screws 98 depend downwardly from the side guides and project through the slot 97 and are provided with nuts 99. A tie bar 100 is confined between the nuts and the underside of the table and serves to maintain the spacing of the side guides. In actual practice, the nuts 95 and 99 are put under only a moderate degree of tension so as to permit free sliding movement of the tray as a whole. Due to the provision of the tie bar, the side guides will remain in their same relative position, even though the tray is shifted transversely of the table.

A cylinder 101 is mounted on side guides 90 and cooperates with uniformly spaced recesses 103 in the table. Thus the tray will be centered in any one of a plurality of predetermined positions which are indicated by indicia 104 on the table 30. Corresponding indicia 105 are formed on the drum, as shown in Fig. 5, to facilitate the proper alignment of the master sheets and block-outs with respect to the copy sheets. A spring loaded ball detent 102 is disposed in cylinder 101.

Forwardly of the slots 92 and 93, the side guides are provided with brackets 106, 107 respectively, which are secured to the vertical portions of the side guides. The brackets terminate in slots which form yokes 108, 109, and the yokes embrace the shaft 66 at the points immediately adjacent the housing 71. Thus, when the tray 31 is shifted, the housing 71 and rubber wheels 79 will also be shifted and vice-versa. In other words, the entire sheet feeding device which includes the tray and the advancing mechanism may be shifted merely by grasping one of the side guides or any other shiftable element.

It will be observed that the tie bar 100 is provided with a series of apertures 110 which permit the width of the tray to be adjusted to accommodate various widths of copy sheets. Where it is desired to provide a tray of adjustable width, a modified form of construction can be employed as shown in Fig. 16. Here the yokes 108, 109 are separate elements with respect to the brackets 106, 107. The yokes and brackets are secured together by suitable means such as screws 111 which project through slots 112 formed in the horizontal portions of the brackets. Thus, the yokes may always be spaced from each other by a distance which corresponds to the width of the housing 71 irrespective of the width of the tray.

As shown in Fig. 12, the usual rubber pads 113 are provided in conjunction with the side guides for resiliently engaging the side edges of the stack 80.

In operation the master sheet is typed up with the name and address of the purchaser on the heading master portion 23 and with the list of goods on the line master portions 24. The master sheet as shown in Figs. 1 and 2 is in the form of an order or invoice, or the like. In this particular application, the copy sheets shown in Figs. 3 and 4 are in the form of shipping labels. In this particular order, the first and second items would be shipped from one department and the third, fourth and fifth items would be shipped from a second department. Therefore, two labels would be required, each label giving in addition to the name and address of the purchaser, the items to be supplied and shipped by that particular department. To facilitate the operation, the master sheet can be coded as indicated by the code marks 114. For instance, opposite the last item of each group, a horizontal line could be drawn, and a small circle can be formed opposite the first item on the master.

Then the master sheet 21 is separated into two parts; the line master is placed on the drum and secured thereto by the grippers 35, and the block-outs 41 and 42 are placed over the line master 24, with the clips 47 inserted in the slot 39. The purpose of coding is to insure that no line will be skipped in making up the different labels. For instance, the block-out 42 is slid up to the line which is identified by the small circle and the blockout 41 is slid up to expose that line which is identified by the first horizontal code mark which follows the small circle. The heading master is inserted into the pocket 51, and is spaced from the edge of the block-out 42 by an amount which corresponds to the spacing 52 which is desired on the copy sheets.

After the proper number of copies or labels have been run off, then the combined block-out 42 is moved inwardly into contact with block-out 41 and then the latter is moved further on so as to expose the line which is identified by the next succeeding horizontal code mark. By virtue of this method of operation, the operator knows instantly how many items will be listed on each label, and by advancing the combined block-out 42 before the block-out 41 is advanced, there is no possibility of inadvertently omitting any line.

It will be understood that each time the block-outs are shifted, the tray 31 and advancing mechanism will be shifted a corresponding distance, and this can be done without lifting the rollers 79.

By the use of the combined block-out and master holder 42, the position of the heading master can be readily shifted without wrinkling or tearing the master and without touching the same, or soiling the fingers.

Furthermore, where the copy sheet is of such a width that the selected line of the master is duplicated on the bottom margin of the copy sheet, it is not necessary to use the block-out 41.

It is obvious that the gear 76 may be keyed or splined to the shaft 66 by other means than the particular keyway 72 and screw 74 shown herein. The term "splined" as used herein is intended to refer to a connection which permits axial movement of the elements which are non-rotatably interclocked with each other.

I claim:

1. The method of duplicating the heading and selected lines of a master sheet in a predetermined spaced relationship on a series of copy sheets which involves the use of a block-out strip shiftably mounted on the surface of a drum, comprising the steps of preparing a single master sheet containing thereon a heading and a plurality of separate lines of matter to be duplicated, severing the master sheet into a heading master and line master, disposing said line master on the drum with the lines thereof perpendicular to the axis of said drum, disposing said block-out strip on said drum adjacent to a selected line whereby those portions of said line master above said selected line are blocked out, disposing said heading master on said first block-out strip with the lower edge of said heading master spaced from the edge of said block-out strip by a distance corresponding to said predetermined spaced relationship, feeding copy sheets from a stack into cooperative engagement with said drum and with said heading and line masters to duplicate said heading and said selected line thereon, shifting said first block-out strip to cover the selected line previously duplicated and into a position adjacent a new line, and shifting said stack of copy sheets by a distance corresponding to the distance through which said block-out strip was shifted.

2. The method of duplicating the heading and selected lines of a master sheet in consecutive order on a series of copy sheets which involves the use of first and second block-out strips shiftably mounted on the surface of a drum, comprising the steps of preparing a single master sheet containing thereon a heading and a plurality of separate lines of matter to be duplicated, severing the master sheet into a heading master and line master, disposing said line master on the drum with the lines thereof perpendicular to the axis of said drum, disposing said block-out strips on said drum for sliding movement in an axial direction and in spaced relationship to each other to expose a selected line and to block-out those portions of said line master above and below said selected line, disposing said heading master over said first block-out strip, feeding copy sheets from a stack into cooperative engagement with said drum and with said heading and line masters to duplicate said heading and said selected line thereon, slidably shifting said first block-out strip into edge to edge engagement with said second block-out strip to cover the selected line previously duplicated, slidably shifting said second block-out strip to expose a new line, and shifting said stack of copy sheets by a distance corresponding to the distance through which said first block-out strip was shifted.

3. A sheet advancing means for mounting on the feed table of a duplicating machine comprising a shaft mounted transversely of the table, drive means mounted on said shaft and including a bearing and a gear means providing a splined connection between said drive means and said shaft to permit axial sliding movement of said drive means on said shaft, an arm mounted on said bearing for rotation independently of said shaft, and sheet feeding rollers spaced from said shaft and carried by said arm and driven from said gear whereby said arm and gear may be shifted axially of said shaft.

4. A sheet advancing means for mounting on the feed table of a duplicating machine comprising a shaft mounted transversely of the table, drive means mounted on said shaft and including a bearing and a gear, means providing a splined connection between said drive means and said shaft, an arm in the form of a housing mounted on said bearing for rotation independently of said shaft, said gear being disposed within said housing, and sheet feeding rollers spaced from said shaft and carried by said arm, and means connecting said gear and said rollers in driving relationship, whereby said arm and gear may be shifted axially of said shaft.

5. A duplicating machine having a drum, a feed table positioned adjacent thereto, means on said drum for holding a relatively narrow master sheet, second holding means on said drum for holding a second master sheet, and a sheet feeding device mounted on said table, said sheet feeding device and said first master holding means both being shiftable in a transverse direction so that the matter of said relatively narrow master sheet may be duplicated upon a succession of relatively narrow copy sheets in variable relationship with respect to additional matter carried on said second master sheet, said sheet feeding device comprising a pair of side guides in predetermined spacial relationship with each other and a sheet advancing roller disposed between said side guides, a transverse drive shaft disposed on said table above said side guides, means mounted on said transverse shaft and shiftable transversely thereof for establishing a driving connection between said sheet advancing roller and said drive shaft, and means to maintain the relative spacing between said side guides and said sheet advancing roller as the transverse position of said side guides is shifted.

References Cited in the file of this patent

UNITED STATES PATENTS

| | | |
|---|---|---|
| 2,049,877 | Storck | Aug. 4, 1936 |
| 2,067,199 | Marchev | Jan. 12, 1937 |
| 2,204,715 | Wimmer | June 18, 1940 |
| 2,215,995 | Bellack | Sept. 24, 1940 |
| 2,220,265 | Morrison | Nov. 5, 1940 |
| 2,231,291 | Morrison | Feb. 11, 1941 |
| 2,236,442 | Neidich | Mar. 25, 1941 |
| 2,237,363 | Ritzenfeld | Apr. 8, 1941 |
| 2,260,045 | Morrison | Oct. 21, 1941 |
| 2,260,464 | Kropp | Oct. 28, 1941 |
| 2,262,510 | Morrison | Nov. 11, 1941 |
| 2,271,954 | Rockhill | Feb. 3, 1942 |
| 2,288,149 | Williams | June 30, 1942 |
| 2,296,533 | Neal | Sept. 22, 1942 |
| 2,313,633 | Ford | Mar. 9, 1943 |
| 2,343,187 | Jagger | Feb. 29, 1944 |
| 2,423,553 | Cochran | July 8, 1947 |
| 2,449,770 | Dempsey | Sept. 21, 1948 |
| 2,660,431 | Levin | Nov. 24, 1953 |